(12) United States Patent
Fuse et al.

(10) Patent No.: US 9,081,945 B2
(45) Date of Patent: Jul. 14, 2015

(54) INFORMATION PROCESSING DEVICE AND METHOD

(71) Applicant: YAHOO JAPAN CORPORATION, Tokyo (JP)

(72) Inventors: Kentaro Fuse, Tokyo (JP); Chiaki Fujimon, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 88 days.

(21) Appl. No.: 13/963,498

(22) Filed: Aug. 9, 2013

(65) Prior Publication Data

US 2014/0090015 A1 Mar. 27, 2014

(30) Foreign Application Priority Data

Sep. 21, 2012 (JP) ................. 2012-208778

(51) Int. Cl.
*H04L 29/06* (2006.01)
*G06F 21/31* (2013.01)
*H04L 9/08* (2006.01)
*G06F 21/45* (2013.01)

(52) U.S. Cl.
CPC ............. *G06F 21/31* (2013.01); *G06F 21/45* (2013.01); *H04L 9/083* (2013.01); *G06F 2221/2131* (2013.01)

(58) Field of Classification Search
CPC ...................................... H04L 9/083
USPC ............................................. 726/2
See application file for complete search history.

(56) References Cited

U.S. PATENT DOCUMENTS 8,719,911 B2 * 5/2014 Novack et al. ............. 726/7
2008/0127331 A1 * 5/2008 Seidman et al. ............ 726/21

FOREIGN PATENT DOCUMENTS

| JP | A-2004-310202 | 11/2004 |
| JP | A-2008-090547 | 4/2008 |
| JP | A-2012-068930 | 4/2012 |

* cited by examiner

*Primary Examiner* — Longbit Chai
(74) *Attorney, Agent, or Firm* — Oliff PLC

(57) ABSTRACT

An information processing device includes a meeting determination unit, an authentication reception unit, and an authentication determination unit. The meeting determination unit determines whether a user who is an authenticatee meets a user who is an authenticator based on information received from terminals used by the users. The authentication reception unit receives information indicating that an authentication operation is performed for the authenticatee from the terminal of the authenticator who is determined to have met the authenticatee. The authentication determination unit permits the authenticatee to use a predetermined information service, when receiving, from a predetermined number of terminals of authenticators, the information indicating that the authentication operation is performed for the authenticatee.

5 Claims, 4 Drawing Sheets

| USER ID | PASSWORD | REGISTERED FRIEND | (OTHER REGISTRATION ITEMS) |
|---|---|---|---|
| A | hoge123 | B, C | ... |
| B | hogehoge456 | A, C | ... |
| C | hohogege789 | A, B | ... |
| ... | ... | ... | ... |

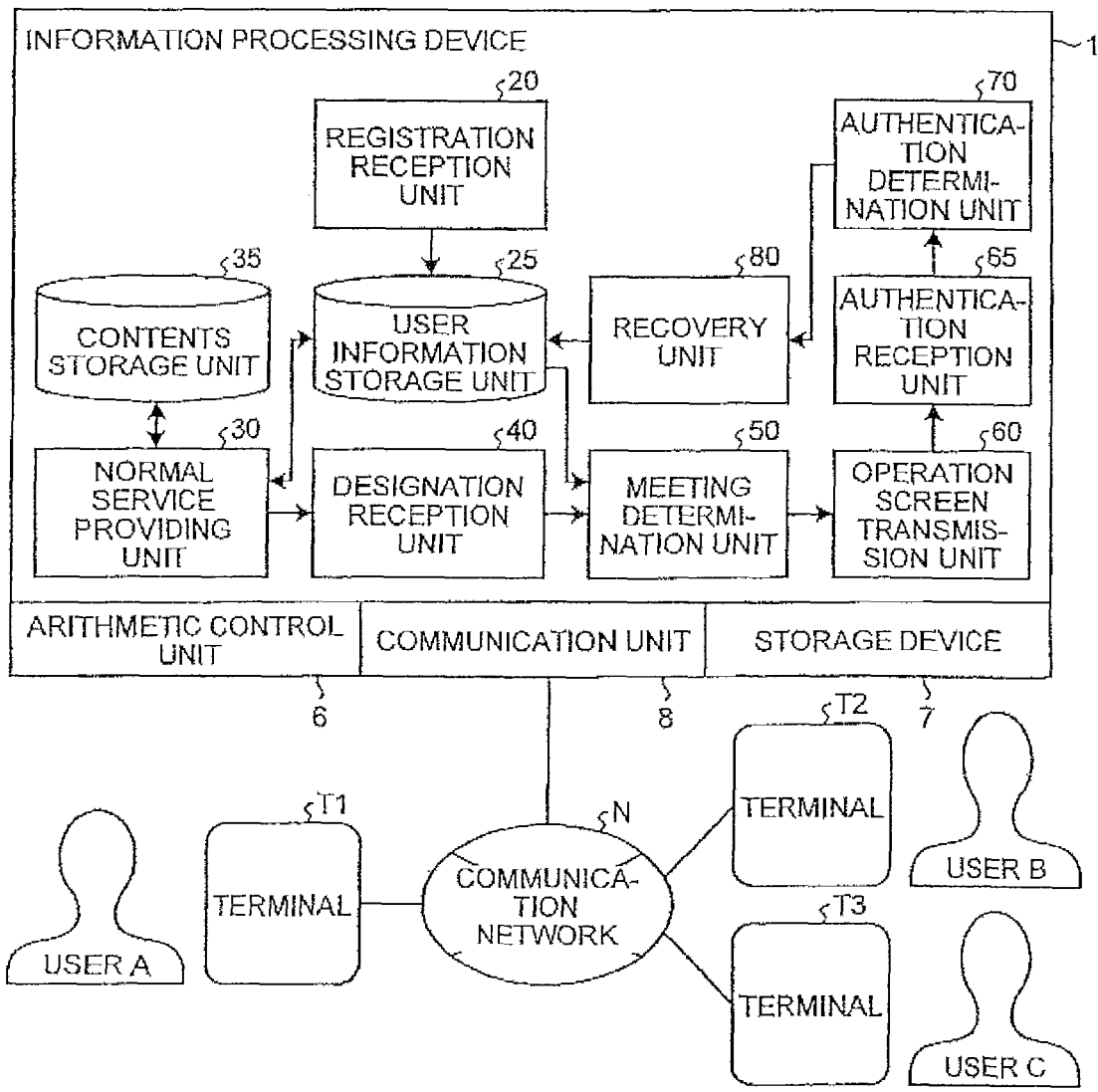

INFORMATION PROCESSING DEVICE AND METHOD

CROSS-REFERENCE TO RELATED APPLICATIONS

The present application claims priority to and incorporates by reference the entire contents of Japanese Patent Application. No. 2012-208778 filed in Japan on Sep. 21, 2012.

BACKGROUND OF THE INVENTION

1. Field of the Invention

The present invention relates to security of an information service.

2. Description of the Related Art

In information services such as SNSs (Social Networking Services) or portal sites provided via communication networks, users are authenticated based on user IDs and passwords. Further, when the user forgets the password, the user can reset the password through "account recovery". As a supplementary authentication method for account recovery or the like, a secret question and a corresponding answer are registered in advance and the user is authenticated based on the registered secret question and answer (for example, see Japanese Laid-open Patent Publication No. 2008-090547 (particularly, claim 11)); alternatively, the user may be authenticated by answering a name corresponding to a displayed facial image of a registered friend of the SNS.

In the conventional technology, however, when the user forgets correct information, i.e., correct answer to the secret question, or the name corresponding to the facial image, authentication cannot be realized. In addition, if the information on the correct answers leaks to the outside, the reliability of authentication is damaged.

The reliability of authentication can be damaged not only through the leakage of information. In a supplementary authentication of account recovery, personal attribute values such as birthday and postal code are used. With the widening of inter-user communications such as the SNS, personal attribute values are likely to be easily known to third parties. Hence, when personal attribute values are used in the account recovery, a problem such as impersonation can arise and the security may be compromised.

SUMMARY OF THE INVENTION

It is an object of the present invention to at least partially solve the problems in the conventional technology.

According to one aspect of an embodiment of the present invention, an information processing device includes: a meeting determination unit that determines whether a user who is an authenticatee meets a user who is an authenticator based on information received from terminals used by the users; an authentication reception unit that receives information indicating that an authentication operation is performed for the authenticatee from the terminal of the authenticator who is determined to have met the authenticatee; and an authentication determination unit that permits the authenticatee to use a predetermined information service, when receiving, from a predetermined number of terminals of authenticators, the information indicating that the authentication operation is performed for the authenticatee.

According to another aspect of an embodiment of the present invention, an information processing method executed by a computer, the method includes; determining whether a user who is an authenticatee meets with a user who is an authenticator based on information received from terminals used by the users; receiving information indicating that an authentication operation is performed for the authenticatee from the terminal of the authenticator who is determined to have met the authenticatee; and permitting the authenticatee to use a predetermined information service, when receiving, from a predetermined number of terminals of authenticators, the information indicating that the authentication operation is performed for the authenticatee.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 1 is a functional block diagram illustrating a configuration according to an embodiment of the invention;

FIG. 2 is a diagram exemplifying information (data) according to the embodiment of the invention;

DETAILED DESCRIPTION OF THE PREFERRED EMBODIMENTS

Figure 3:
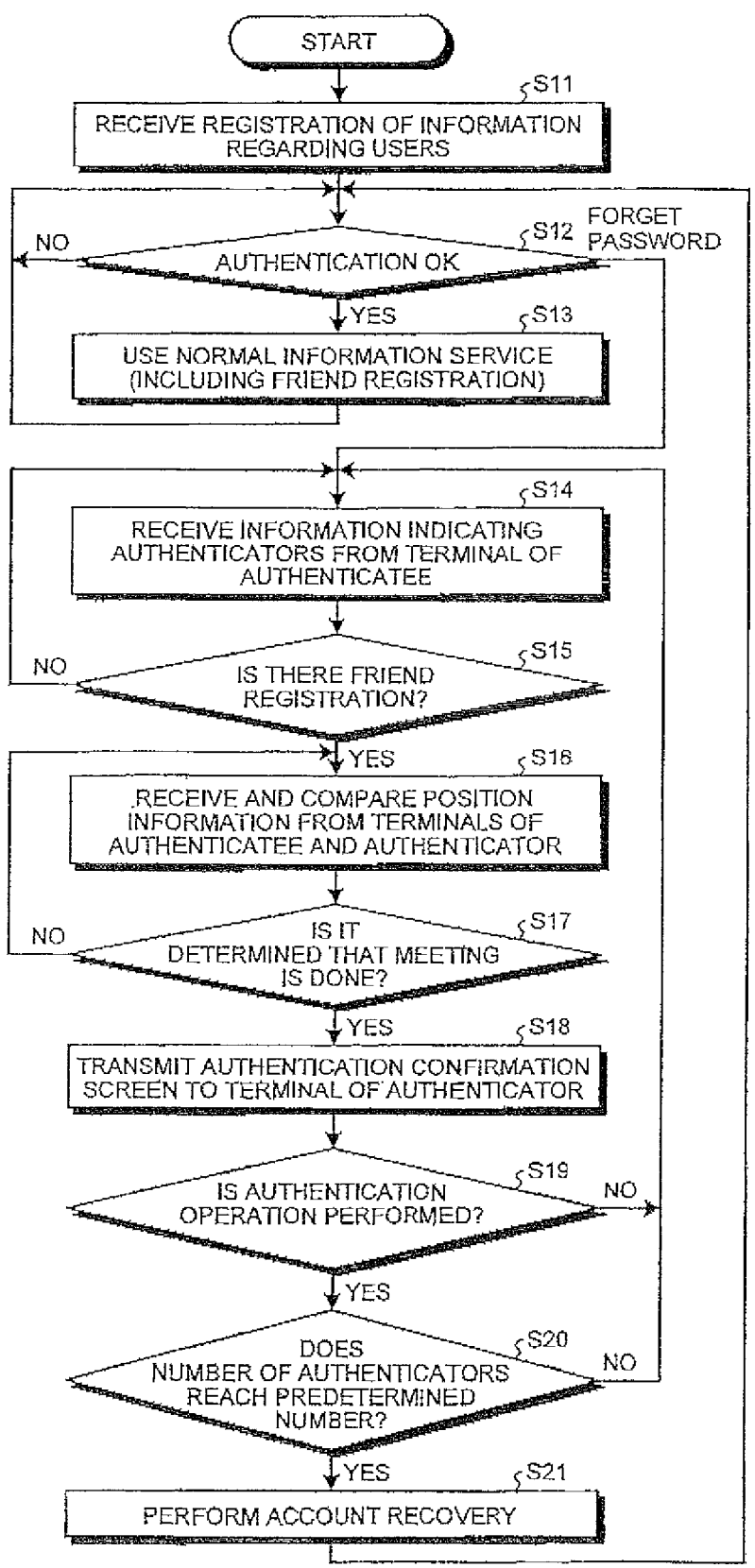
FIG. 3 is a flowchart illustrating a processing order according to the embodiment of the invention.

Hereinafter, a mode (referred to as an "embodiment") for carrying out the present invention will be exemplified with reference to the drawings. The assumption factors common to the details described above in the technical background, the problems, and the like will be omitted as appropriate.

1. Configuration

FIG. 1 is a diagram illustrating an overall configuration according to the embodiment. An information processing device 1 is a server that performs authentication using an actual acquaintance according to an embodiment of the invention, to authenticate the user through, e.g., account recovery and allow the user to use a predetermined information service. The information processing device 1 may be hereinafter referred to as a "present device 1" or a "present device." Terminals T (T1 to T3) are mobile information terminals including a computer, such as smartphones or mobile telephone terminals and are used by users (for example, users A to C) to access the present device 1.

The present device 1 includes an arithmetic control unit 6 such as a CPU (Central Processing Unit), a storage device 7 such as a main memory or an auxiliary storage device (for example, a flash memory or others), and a communication unit 8 (for example, a communication circuit or a wireless LAN (Local Area Network) adapter communicating with a mobile communication network) communicating with a communication network N (for example, the Internet or various wireless communication networks of cellular phones, PHSs (Personal Handyphone Systems), public wireless LANs, and the like), as a configuration of a computer.

Although not illustrated, the terminals T include a rechargeable battery control unit that controls charging and discharging of an internal battery, a calling control unit that performs sending or receiving of call or sound processing, a positioning unit that positions a location of a terminal using GPS (Global Positioning System) or the like, and a display screen such as a liquid crystal with a touch panel function, in addition to the above-described configuration of the computer.

In the present device 1, constituent elements illustrated in FIG. 1 are realized by causing the arithmetic control unit 6 to execute a program not illustrated). The program is, for example, basic software, en application program, various kinds of middleware, or a script. Of the realized constituent elements, an information storage unit may be not only various files or work areas on the storage device 7 but also remote storages or the like realized by network computer (cloud).

The storage unit may include not only a data storage region but also a function such as input and output or management of data. Units of the storage units are illustrated in the description merely by way of example, and the storage units can be divided or integrated as appropriate. Further, besides the storage units specifically described in the description, additional storage units may be employed to store processed data, processed results, or the like. FIG. 2 illustrates an example of information stored in a user information storage unit 25 (which will be described below).

An arrow in the drawing (for example, FIG. 1) indicates a main direction of flow of data, control, or the like in an auxiliary manner axed does not mean negation of another flow or limitation to a direction. For example, before and attar data is acquired in a given direction, a data request or a response of acknowledgement (ACK) can be generated in an opposite direction thereto.

Respective units other than the storage unit are processing units that realize a functional process of the information processing to be described below. However, the units are functional units for the description, and thus may not accord with actual hardware elements or software modules.

2. Processes

FIG. 3 is a flowchart illustrating a processing order of the present device 1 according to this embodiment. In the present device 1, a registration reception unit 20 receives registration of information regarding users who use information services and association between the users (hereinafter, referred to as "friend registration").

Specifically, for example, when use of an SNS which is an information service starts, the registration reception unit 20 receives registration of information (for example, respective items such as a user ID, a password, and a profile) regarding the user in user registration (step S11) and stores the information in the user information storage unit 25 (for example, FIG. 2).

Here, service providing units include a normal service providing unit 30 and a recovery unit 80. Of these units, the normal service providing unit 30 is a unit that provides inter-user communication as an information service other than account recovery in a case of an SNS (Social Networking Service).

Specifically, the inter-user communication provided as the SNS by the normal service providing unit 30 is, for example, a service that accumulates messages or image files posted by the user to the present device 1 in a content storage unit 35 and allows other users who are registered friends of the user who posted the messages or the image files to browse the messages or the image files. Further, the recovery unit 80 is a unit that provides resetting of a password, that is, account recovery, for example, when a user forgets the password or a password is unexpectedly changed.

Then, the normal service providing unit 30 performs user authentication using, for example, a user ID and a password stored in the user information storage unit 25. When the result is positive (authentication OK) ("YES" in step S12), the normal service providing unit 30 provides an SNS to the user through the terminal T (step S13).

The registration reception unit 20 receives, in association with the SNS, the registration of friends. In the example of FIG. 2, with each user ID, user IDs of persons who are registered friends (hereinafter also referred to as "acquaintances") of the person of this user ID are associated.

2-1. Start of Authentication by Meeting

When the user forgets a password or the like at the start of authentication for the use of the SNS, and when, for example, the normal service providing unit 30 receives a selection operation which instructs to perform account recovery (step S12: "Forget Password"), authentication based on meeting with acquaintance starts.

In this authentication, the user meets a predetermined number of people (in the embodiment, the number of people is two, but the number of people may arbitrarily be set, such as one or three or more) who are registered friends of the SNS, and these people perform a predetermined authentication operation on their terminals. Then, the authentication for account recovery becomes positive, and the user can perform the account recovery.

By way of example, assume that users A, B and C (FIG. 1) are registered friends with each other, and user A forgets a password and tries to be authenticated by meeting the acquaintances B and C. In the authentication via meeting, a designation reception unit 40 restricts authenticators to the acquaintances who are users associated with an authenticatee.

2-2. Designation of Authenticator

Specifically, the designation reception unit 40 receives information indicating the users B and C (referred to as authenticators B and C) who are authenticators designated in the terminal T1 from the terminal T1 of the user A (referred to as an authenticatee A) who is an authenticatee (step S14).

The designation of the authenticator is received on a predetermined web page provided from the present device 1 to the terminal T or a display screen of a predetermined application program (also referred to as an "app") installed in advance in the terminal T. As the information indicating the authenticator to receive the designation of the authenticator, for example, a character string of a user ID (for example, in a simple example, "B," "C," or the like) of an acquaintance desired to be designated as the authenticator is input to a predetermined input section using the terminal T1 by the authenticatee A (FIG. 4).

Figure 4:
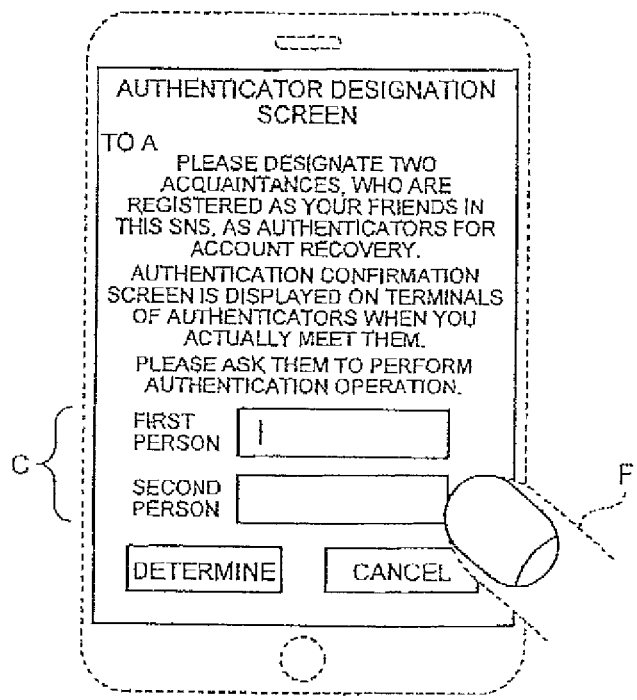
FIG. 4 is a diagram illustrating a screen display example according to the embodiment of the invention.

For example, when an input section C on a screen example of FIG. 4 is tapped and selected with a finger F, a software keyboard for character input is displayed. The character input may be realized through any conventional methods, and hence, the description thereof will not be provided herein.

When the designated authenticator is not associated with the authenticatee, that is, there is no friend registration ("NO" in step S15), the designation reception unit 40 requests the designation again, for example, by notifying the terminal T1 of the authenticatee that an error occurs (step S14).

Here, the user A who is an authenticatee is assumed to designate the users B and C who are acquaintances as authenticators. In this case, as exemplified in FIG. 2, the user A is a registered friend of the designated users B and C ("YES" in step S15). Therefore, the designation reception unit 40 receives the designation and displays an appropriate designation confirmation screen (not illustrated), and the authenticatee A meets the authenticators B and C designated by the authenticatee A.

2-3. Determination of Meeting

When the acquaintances are designated as the authenticators, a meeting determination unit 50 determines that the user who is the authenticatee meets the users who are the authenticators based on information received from the terminal used by the user. The information received from the terminal may be information received from the terminals of both of the authenticatee and the authenticator or may be information received from one of the terminals.

Here, an example of determination performed using the information received from both terminals will be described. For example, a meeting of the authenticatee A and the authenticator B will be exemplified. In this case, the meeting determination unit 50 periodically receives the position information from the terminal T1 of the authenticatee A and the terminal T2 of the authenticator B, compares the received position information with each other (step S16), and determines that the meeting is done when the received position information items accord with each other ("YES" in step S17).

Even when a distance between, for example, the latitudes and longitudes indicated by the position information is within a predetermined error range, it is determined that the position information items accord with each other.

2-4. Authentication Operation

When it is determined that the authenticatee A and the authenticator B meet ("YES" in step S17), an operation screen transmission unit 60 transmits an authentication operation screen as screen display data to the terminal T2 of the designated authenticator B (step S18). The authentication operation screen is a screen used to receive an authentication operation from the user (for example, the user B) and transmits information indicating that the authentication operation is performed to the present device 1 (for example, FIG. 5).

When a person the authenticator B meets is an authentic authenticatee A, the authenticator B performs a predetermined authentication operation such as an operation on a button B1 indicating "AUTHENTICATE" on the authentication operation screen (FIG. 5) displayed on the terminal T2. Then, the terminal T2 transmits information indicating that the authentication operation is performed to the present device 1. Then, when the information indicating that the authentication operation is performed for the authenticatee is received from the terminals of the preset number of authenticators, an authentication determination unit 70 permits the authenticatee to use the information service.

Specifically, when an authentication reception unit 65 of the present device 1 receives the information indicating that the authentication operation is performed for the authenticatee A from the terminal T2 of the authenticator B who is determined to have met the authenticatee A, the authentication reception unit 65 determines that the authentication operation is performed ("YES" in step S19).

When an event from the designation of the authenticators (step S14) to the authentication operation (step S19) occurs for a predetermined number of authenticators (here, two authenticators B and C) ("YES" in step S20), the authentication determination unit 70 permits the authenticatee (for example, the user A) to use the information service.

2-5. Account Recovery

Figure 6:
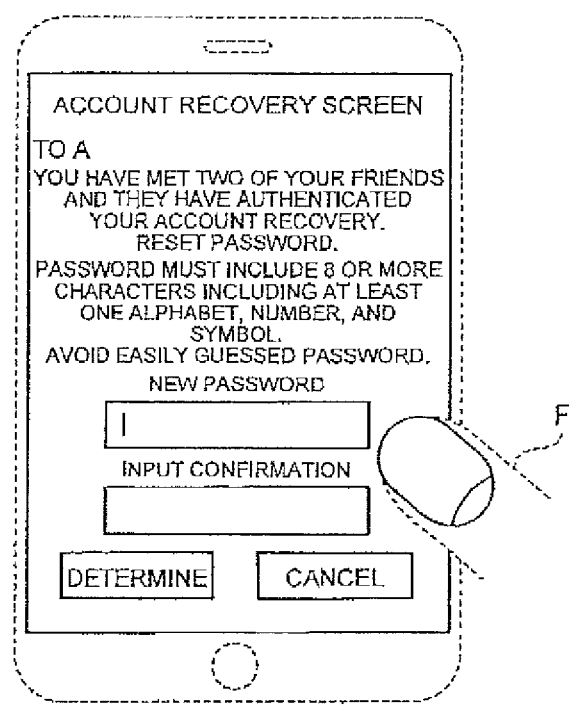
FIG. 6 is a diagram illustrating a screen display example according to the embodiment of the invention.

The information service permitted to use here is account recovery performed by a recovery unit 80 (step S21) In the account recovery, the user can set, for example, a new password as authentication information on a predetermined account recovery screen (for example, FIG. 6)

On the other hand, when the authentication operation is not performed due to any reason ("NO" in step S19), as in a case in which a button B2 in the authentication operation screen (FIG. 5) is operated indicating that no authentication is performed, or the number of authenticators performing the authentication operation is not sufficient ("NO" in step S20), the processes are performed again from the designation of the authenticators (step S14).

3. Advantages

Figure 5:
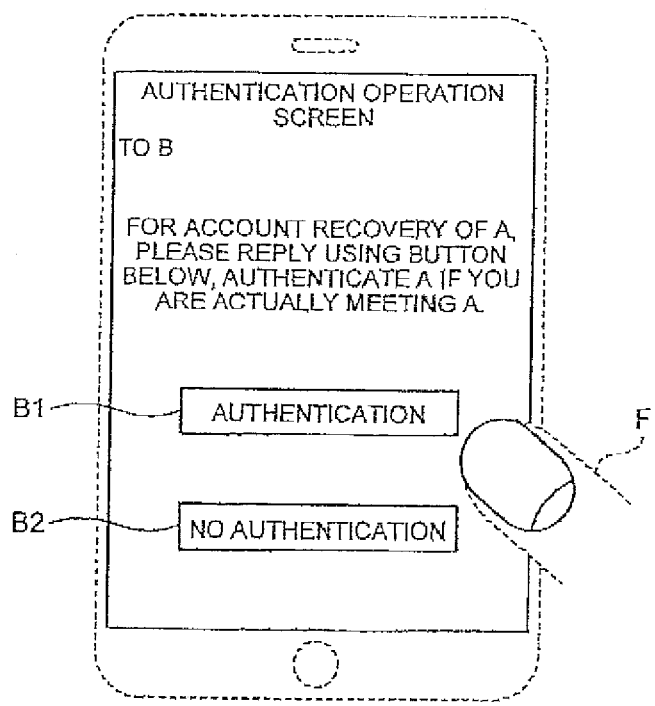
FIG. 5 is a diagram illustrating a screen display example according to the embodiment of the invention.

In this embodiment, as described above, a use (for example, the user A of FIG. 1) actually meets a predetermined number (the number of people can be arbitrarily set) of acquaintances (for example, the users B and C) registered for the same information service, and the predetermined number of acquaintances perform the authentication operation (for example, FIG. 5). Thus, easy and highly-accurate identity verification performed by people in the real world can be utilized in authentication in information services.

In particular, in this embodiment, by applying the invention to the account recovery (for example, FIG. 6),it is possible to avoid a risk that the user forgets a correct answer to the secret question or the like and becomes unable to perform the account recovery.

In this embodiment, the reliability of the authentication can be ensured since a user of the same information service who is associated with the authenticatee performs the authentication (for example, step S15 of FIG. 3).

In this embodiment, the authenticatee is allowed to designate the authenticator (for example, FIG. 4) and the authenticator is allowed to perform the authentication operation (for example, FIG. 5). Thus, by setting a predetermined operation in the terminals of both of the authenticatee and the authenticator as en authentication condition, the authentication can be reliably realized.

In this embodiment, by comparing the position information transmitted from the terminals of both of the authenticatee and the authenticator and determining that the authenticator and authenticatee meet when the position information items accord with each other (for example, step S17 of FIG. 3), it is possible to reduce a burden on the authenticator and authenticatee of, for example, exchanging information directly between their terminals for the determination of the meeting.

4. Other Embodiments

The above-described embodiment is merely an example and the present invention includes embodiments to be exemplified below and other embodiments. For example, the drawings of the configuration, the drawings of the data, the flowchart, and the like in the present application are merely examples. Presence or absence of each constituent element, the disposition of each constituent element, an order of the processing execution or the like, the specific contents, and the like can be appropriately changed. The authentication according to this embodiment is not limited to the account recovery, but may be used as authentication for using another information service.

The position information received from the terminals of the both according to the above-described embodiment has been illustrated as "information received from terminals" used to determine whether the authenticatee and the authenticator meet. However, information received from one of the terminals may be used.

For example, a two-dimensional barcode indicating the URL of a predetermined web is transmitted from the present device 1 to one of the terminals, is displayed on a screen, and is read by a camera function of the other terminal, and then the other terminal accesses the URL. When the present device 1 receives, for example, an HTTP page request to the URL, it is determined that the owners of the two terminals meet.

Each aspect described the present application may be comprehended according to another category (a method, a program, a system including terminals, or the like). In the category of the method or the program, the "unit" described in the category of the device is appropriately replaced with a "process" or a "step." An order of processes or steps is not limited to the order directly stated in the present application, but the order may be changed or the processes may be changed. For example, some of the processes may be summarized or the processes may be frequently performed in parts.

Computers such as to terminals realizing and executing the individual units and the processes or steps may be common or may be different for each unit, each process or step, or each timing. For example, the present device 1 may be configured as a plurality of server computers. Further, all or arbitrary some of the above-described "units" may be replaced with "portions" (sections, modules, or the like).

An aspect for realizing individual units of the present device 1 is freely configured, and thus the configuration of the present invention may be flexibly changed. For example, functions provided by an external server may be called and realized by an API (Application Program Interface) or network computing (so-called cloud or the like). Further, each constituent element such as a unit relevant to the present invention is not limited to an arithmetic control unit of a computer, but may be realized by another information processing unit such as a physical electronic circuit.

According to an embodiment of the invention, easy and highly-accurate identity verification performed by people in the real world can be utilized in authentication in information services.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing device comprising:
   a meeting determination unit that determines that a user of a terminal meets an authenticator, who is a user of another terminal and a different person from the user of the terminal, when position information sent from the terminal of the user accords with position information sent from the another terminal of the authenticator;
   an authentication reception unit that receives information indicating that an authentication operation is performed for the user from the another terminal of the authenticator who is determined to have met the user; and
   an authentication determination unit that permits the user to use a predetermined information service, when receiving, from a predetermined number of another terminals of authenticators, the information indicating that the authentication operation is performed for the user.

2. The information processing device according to claim 1, wherein the information service is account recovery in which authentication information is reset.

3. The information processing device according to claim 1, further comprising: a registration reception unit that receives registration of information regarding the users using the information service and association between the users, wherein the registration reception unit further receives registration of one or more users as an authenticator of another user, from among users associated with the another user.

4. The information processing device according to claim 1, further comprising:
   a designation reception unit that receives information indicating the authenticator designated in the terminal of the user from the terminal of the user; and
   an operation screen transmission unit that transmits, to the terminal of the designated authenticator, screen display data configured to receive the authentication operation and transmit information indicating that the authentication operation is performed to the information processing device.

5. An information processing method executed by a computer, the method comprising:
   determining that a user of a terminal meets an authenticator, who is a user of another terminal and a different person from the user of the terminal, when position information sent from the terminal of the user accords with position information sent from the another terminal of the authenticator;
   receiving information indicating that an authentication operation is performed for the user from the another terminal of the authenticator who is determined to have met the user; and
   permitting the user to use a predetermined information service, when receiving, from a predetermined number of another terminals of authenticators, the information indicating that the authentication operation is performed for the user.

* * * * *